H. G. CARR.
SHOCK ABSORBER.
APPLICATION FILED FEB. 26, 1917.
1,240,822.
Patented Sept. 25, 1917.
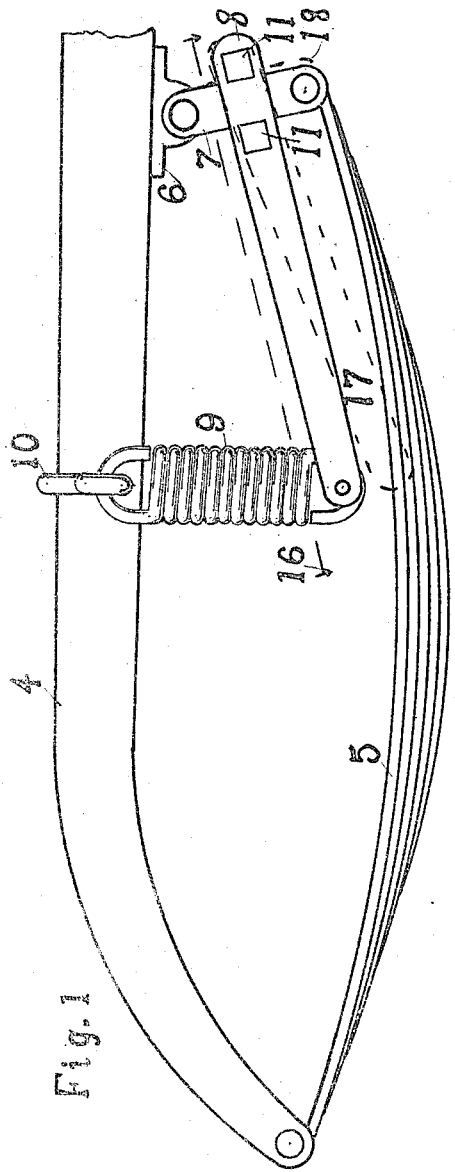
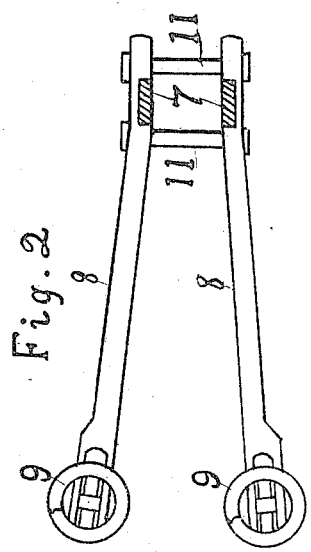
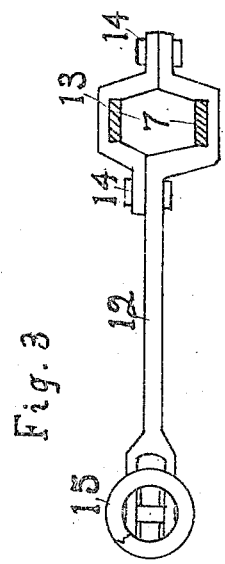
Witnesses:
Inventor
Howard G. Carr.

UNITED STATES PATENT OFFICE.

HOWARD G. CARR, OF HOOPESTON, ILLINOIS.

SHOCK-ABSORBER.

1,240,822.

Specification of Letters Patent.

Patented Sept. 25, 1917.

Application filed February 26, 1917. Serial No. 151,046.

*To all whom it may concern:*

Be it known that I, HOWARD G. CARR, a citizen of the United States, residing at 910 East Main street, in the city of Hoopeston, in the county of Vermilion and State of Illinois, have invented new and useful Improvements in Shock-Absorbers, of which the following is a specification.

This invention relates to a device that attaches to the shackle of the ordinary vehicle spring, and gives easy riding qualities to a vehicle. It accomplishes this object by performing in general three functions. One function is to give an automatic spring adjustment to the various loads the vehicle may carry; another function is to relieve the body of the vehicle from torsional stresses arising from spring tension; the other function is to rid the vehicle of the upthrow or rebound from the retraction of the springs after being forced from their normal positions.

It is also the object of this improvement to provide a device of this class that is inexpensive and that may be attached by any one easily and in a few minutes' time.

I attain these objects by the mechanism illustrated in the accompanying drawings, in which—

Figure 1 shows a side view of the device attached to an automobile spring suspension; Fig. 2 shows a sectional view from the line 16 in Fig. 1; Fig. 3 shows a sectional view of the same character as Fig. 2, showing a modification of the device.

Similar characters of reference indicate like parts throughout all the views of the drawings.

Referring to the drawings, 4 is the vehicle frame, 5 is the vehicle spring, 6 the perch, and 7, 7 the shackles. Secured by the bolts 11, 11 to the shackles 7, 7 are the levers 8, 8. Secured to the other ends of the levers 8, 8 are the contractile springs 9, 9, which are suspended by the yoke 10 from the frame 4.

In Fig. 3 I show a single lever embodiment of my invention. The lever 12 is secured to the shackles 7, 7 by the clamp 13 and the bolts 14, 14. The other end of the lever 12 is supported by the contractile spring 15 which is suspended from the frame 4 in any suitable manner.

The levers 8, 8 or 12 may be secured to the shackles 7, 7 in any other suitable manner.

With the springs 9, 9 disconnected the shackles 7, 7 would stand in the position indicated by the dotted lines 18 and the levers 8, 8 would stand in the position indicated by the dotted lines 17. When the levers 8, 8 are secured by the springs 9, 9 and the yoke 10 to the frame 4, the various members of my device and of the vehicle are in the position shown in Fig. 1, and the load is carried by the tension of the springs 9, 9, since raising the ends of the levers 8, 8 will not allow the tension of spring 5 to be flexed beyond its normal tension until the springs 9, 9 are extended enough to let the shackles 7, 7 and the end of the spring 5 pass beyond the position shown by the dotted lines 18, then the spring 5 would be extended beyond its normal length and its tensional force would help to supplement the tensional forces of the springs 9, 9 and assist or relieve the springs 9, 9 when overloaded or extended.

The springs 9, 9 and 5 exert tensional forces in opposite directions on the frame 4, consequently the body is not affected by torsional stresses arising from tensional forces of the springs. The springs 9, 9 in retracting after extension, pull downwardly on the frame 4, preventing an upthrow or rebound of the frame and body of the vehicle.

I claim:

In combination with a frame, a spring supporting said frame, a perch, and shackles supporting said spring from said perch, a lever having an end adapted to be attached to or detached from said shackles, the other end of said lever being secured to a contractile spring, and means for suspending said contractile spring from said frame.

In testimony that I claim the foregoing as my own, I have hereto affixed my signature in presence of two witnesses.

HOWARD G. CARR.

Witnesses:
 JAY BRIGGS,
 JOSEPH H. DECKER.

Copies of this patent may be obtained for five cents each, by addressing the "Commissioner of Patents, Washington, D. C."